United States Patent
Douche et al.

(10) Patent No.: US 6,598,427 B1
(45) Date of Patent: Jul. 29, 2003

(54) DEVICE FOR COOLING CONVEX GLASS SHEETS

(75) Inventors: Jean-Pierre Douche, Le Plessis Brion (FR); Jean-Marc Petitcollin, Thourotte (FR); Gilles Garnier, Thourotte (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/284,973

(22) PCT Filed: Sep. 10, 1998

(86) PCT No.: PCT/FR98/01933

§ 371 (c)(1),
(2), (4) Date: Oct. 28, 1999

(87) PCT Pub. No.: WO99/12855

PCT Pub. Date: Mar. 18, 1999

(30) Foreign Application Priority Data

Sep. 11, 1997 (FR) .............................................. 97 11287

(51) Int. Cl.[7] .............................................. C03B 23/033
(52) U.S. Cl. .............................. 65/118; 65/102; 65/107; 65/228; 65/265; 65/351
(58) Field of Search ........................... 65/118, 115, 103, 65/107, 348, 351, 228, 265, 102; 62/62

(56) References Cited

U.S. PATENT DOCUMENTS

| 3,396,000 | A | * | 8/1968 | Carson et al. |
| 4,268,297 | A | * | 5/1981 | Gorner |
| 4,292,065 | A | * | 9/1981 | Nedelec et al. |
| 5,112,377 | A | * | 5/1992 | Aratani |
| 5,139,552 | A | * | 8/1992 | Yoshizawa et al. |
| 5,620,492 | A | * | 4/1997 | Land |
| 5,622,539 | A | * | 4/1997 | Lesage et al. |
| 6,370,917 | B1 | * | 4/2002 | Kato et al. |

FOREIGN PATENT DOCUMENTS

WO      WO 91/11398      8/1991

* cited by examiner

Primary Examiner—Deborah Jones
Assistant Examiner—Jennifer McNeil
(74) Attorney, Agent, or Firm—Oblon, Spivak, McClelland, Maier & Neustadt, P.C.

(57) ABSTRACT

A device for cooling bent glass sheets running along a roller conveyor. Blowing boxes are inserted between the rollers and have a surface opposite the glass sheet at a distance of less than 30 mm and preferably less than 10 mm. The surface is perforated with several holes through which air is discharged in the direction of the glass sheets.

26 Claims, 3 Drawing Sheets

DEVICE FOR COOLING CONVEX GLASS SHEETS

BACKGROUND OF THE INVENTION

1. Field of the Invention

The invention relates to a device for cooling bent glass sheets. More specifically, the invention relates to a device for cooling glass sheets on the run, that is to say in which the glass sheets are advancing while they are being cooled. Although the invention is not limited to such devices, it will be more particularly described with reference to techniques for bending and for toughening glass sheets which are running along a roller conveyor having a profile that is curved in the direction in which the glass sheets run.

2. Discussion of the Background

The abovementioned techniques are known, especially from French Patents FR-B-2,242,219 and FR-B-2,549,465, and consist in making glass sheets, heated in a horizontal furnace, run between two layers of rollers—or other rotating elements—arranged in a curvilinear profile and passing through a terminal toughening zone. For the production of side windows, sun-roofs or other windows, especially of cylindrical shape, the layers consist, for example, of straight cylindrical rods arranged in a circular profile. The layers may also consist of elements giving the windows a second curvature, such as conical elements or else of the diabolo/barrel type. This technique makes it possible to achieve a very high production capacity since, on the one hand, the glass sheets do not have to be widely spaced, it being possible for one glass sheet to enter the forming zone without any problem while the treatment for preceding sheet has not been completed and, on the other hand, if the length of the rollers allows it, two or three glass sheets arranged transversely may be treated simultaneously.

The run speed of the glass sheets, or plates is at least equal to 10 cm/s and is about 15 to 25 cm/s. The speed normally does not exceed 30 cm/s in order to allow a sufficient toughening time.

Under relatively standard blowing conditions and for a 3.2 mm thick glass sheet, having to meet the requirements of European Regulation No. 43 relating to the homologation of safety-glass windows and materials for windows intended to be fitted into motor vehicles and their trailers, the techniques described above are completely satisfactory. According to the requirements of the abovementioned regulation, the toughening stresses must be such that the window, should it break, does so into a number of fragments which, in any 5×5 cm square, is neither less than 40 nor greater than 350 (this number increases to 400 in the case of windows having a thickness of less than or equal to 2.5 mm). Still according to these requirements, no fragment must be greater than 3.5 cm, except possibly in a strip 2 cm in width at the periphery of the window and within a 7.5 cm radius around the point of impact, and there must be no elongate fragment with a length greater than 7.5 cm.

When the thickness of the glass sheets decreases, and in order to meet the same toughening standards, the heat exchange coefficient must be greatly increased. With regard to standard toughening plants, i.e. plants having nozzles of a given diameter, the heat exchange coefficient is improved by increasing the air flow rate, which leads to a greater velocity of the air around the glass sheets.

Such a construction firstly has the drawback of requiring boosters or new, more powerful, plants in order to produce the required air flow rates, these being very expensive. Moreover, this results in local overpressures and confinement of the air which cannot very easily escape, especially on the upper face in the case of a sheet running on an upwardly concave conveyor. Such a confinement then results, to the contrary, in a decrease in the heat exchange coefficient.

Another solution consists in decreasing the diameter of the nozzles in order to increase the velocity of the air at a constant flow rate. In such a case, the decrease in diameter of the nozzles means that the orifices have to be closer to the glass sheets in order to maintain the required velocities at the surface of the said glass sheets. However, to obtain such a result, it is necessary to use very long nozzles which result in very large pressure drops unacceptable from an industrial standpoint, especially because of

SUMMARY OF THE INVENTION

The object of the invention is thus to provide a novel device for cooling bent glass sheets which is more flexible from a use standpoint than the current techniques and which makes it possible to increase the heat exchange coefficient while obviating the abovementioned drawbacks and, more particularly, without requiring fundamentally different and expensive plants.

This object is achieved according to the invention by a device for cooling bent glass sheets on a roller conveyor, the said device comprising blowing boxes inserted between the rollers and having a surface opposite the glass sheet at a distance from the latter of less than 30 mm and preferably of less than 10 mm, the said surface being drilled with several holes from which the air is driven towards the glass sheet.

Rollers should be understood to mean any type of axisymmetric element which, because of its shape and/or its arrangement, can give the glass sheets a curvature. They are, for example, cylinders, devices of the diabolo/barrel type, conical systems and hogged systems, especially such as those described in Patents EP-B-0,263,030 and EP-B-0,474,531.

Such a device according to the invention allows an effective increase in the heat exchange coefficient while retaining the basic cooling plants and not requiring boosters, especially for the purpose of obtaining higher blown air flow rates. Since the blown air flow rates have not been increased with respect to the usual operating conditions, the risks of local overpressure and therefore of air confinement are avoided. Moreover, the construction of boxes having a plate drilled with holes considerably limits the pressure drops, especially with respect to the flow of air in the tube forming a blowing nozzle.

According to a preferred embodiment of the invention, especially in the case of toughening bent glass sheets, the boxes are positioned above and below the path of the glass sheets.

Preferably again, the diameters of the holes are between 2 and 8 mm and advantageously less than 5 mm; they are distributed with a pitch of less than 20 mm and preferably of between 3 and 6 mm. This preferred embodiment not only allows the heat exchange coefficient to be increased with respect to the usual cooling techniques, especially for a given air flow rate, but it also allows more homogeneous distribution of the cooling at the surface of a glass sheet. This is because, compared with the usual cooling plants, the blowing orifices are closer together and result in greater blowing homogeneity at the surface of a glass sheet. The usual cooling plants consist of nozzles distributed with a pitch of generally greater than 30 mm, which results in acceptable cooling of the glass surface from a results standpoint, but the cooling is markedly less homogeneous than in the device proposed by the invention.

According to an advantageous embodiment of the invention, the device, combined with a blowing pressure of less than 3000 mm of water column, allows a coefficient of heat exchange with the glass of at least 800 W/m$^2$·K and preferably of at least 1000 W/m$^2$·K. The current techniques, although they are not associated with very expensive means, such as boosters, cannot exceed a heat exchange coefficient of about 800 W/m$^2$·K.

According to an alternative form of the invention, the device is used at the start of the cooling zone, the rest of the zone remaining in a standard configuration. In this way, the glass sheets run along a conveyor and are cooled in two phases, the heat exchange coefficient being greater during the first phase.

Such an embodiment is particularly advantageous in the case of toughening the glass; this is because it allows a high heat exchange coefficient at the start of toughening and a lower one thereafter. The inventors have evidence for the fact that, for toughening a given glass sheet, modulated toughening consisting of a high heat exchange coefficient at the start, and then a lower one afterwards, leads to results from a toughening standpoint that are superior to those obtained with a constant heat exchange coefficient, for the same overall energy costs.

According to other alternative forms of the invention, it is possible to provide differential cooling of a glass sheet between its two faces; in particular, it is in fact possible to equip the cooling unit with a device according to the invention opposite only one face of the glass sheets, the other face being cooled by standard devices. In this way, it is possible to obtain a higher heat exchange coefficient for one of the two faces. Especially in the case of toughening, such a technique allows the curvature of the bent glass sheets to be modified.

In order to achieve similar results, the invention also proposes to differentiate the heat exchange coefficient on the same surface at a given instant. To do this, the invention advantageously provides for that surface of the boxes which is opposite one face of the glass to be drilled with holes which are not all the same size. According to a preferred embodiment of the invention, the blowing holes are holes of varying aperture; these may be obtained by movable elements which partially or completely mask a hole.

According to a preferred embodiment of the invention, the rollers of the conveyor are positioned in an upwardly concave curved profile. The device thus described according to the invention is advantageously intended for toughening bent glass sheets on plants of the type described in French Patents FR-B-2,242,219 and FR-B-2,549,465. In the technique described in these documents, the rollers usually have diameters of between 20 and 30 mm and are spaced apart with a pitch of between 40 and 130 mm. It was not obvious to insert into these plants devices such as those of the invention which, especially in the case of small diameter holes, must be very close to the surfaces of the glass sheets, for fear of the problem of extracting the blown air. Tests have shown that, despite the closeness of the blowing holes to the glass sheets, the air can be properly extracted, resulting in heat exchange coefficients that are higher than those obtained with the standard toughening plants.

The use of a device according to the invention in this type of plant makes it possible to bend and toughen glass sheets that are thinner than those normally toughened in this type of plant. This is because the minimum thickness of glass sheet that the current plants usually allow to be toughened is 3.15 mm, which corresponds to a heat exchange coefficient of approximately 600 W/m$^2$·K. Without any modification, the device according to the invention allows glass sheets with a thickness of 2.85 mm or even 2.5 mm to be toughened, this corresponding to a heat exchange coefficient which may be as much as 1000 W/m$^2$·K.

The invention also makes it possible to improve, especially from a productivity standpoint, the results usually obtained for toughening glass sheets having holes which pass through their thickness. It is quite often the case for there to be holes of this type in glass sheets intended for equipping motor vehicles and for being fitted in a sliding manner, in order to allow opening.

The device according to the invention also makes it possible to improve the optical quality of the glass sheets, this device allowing more homogeneous blowing distribution than the usual techniques. This improvement in optical quality of the glass sheets is even greater for the production of laminated glazing assemblies. This is because combining two glass sheets, or more generally two sheets of transparent materials, does not mean that their defects from an optical standpoint are added, rather it increases them much more.

The DIN 32 305 standard defines an "optical quality" for side windows intended for the motor-vehicle industry.

The invention thus makes it possible to produce laminated glazing assemblies comprising at least one glass sheet having surface stresses of greater than 60 MPa, the said laminated glazing assembly complying with the DIN 32 305 standard.

In particular, the invention allows the production of a laminated glazing assembly comprising at least one toughened glass sheet having surface stresses of greater than 100 MPa and preferably of about 130 MPa, the said laminated glazing assembly complying with the DIN 32 305 standard.

A laminated glazing assembly of this type is especially advantageous for impact-resistance functions. These laminated glazing assemblies may comprise one or more glass sheets, whatever their thicknesses. However, the invention also makes it possible to produce such laminated glazing assemblies using glass sheets with a thickness of less than 3 mm and preferably of less than 2 mm, it being possible for the said laminated glazing assemblies to have the thickness of the monolithic glazing assemblies currently used in motor vehicles.

BRIEF DESCRIPTION OF THE DRAWINGS

Further details and advantageous characteristics of the invention will emerge below from the description of an illustrative embodiment, with reference to the figures which represent.

DETAILED DESCRIPTION OF THE PREFERRED EMBODIMENTS

Figure 1:
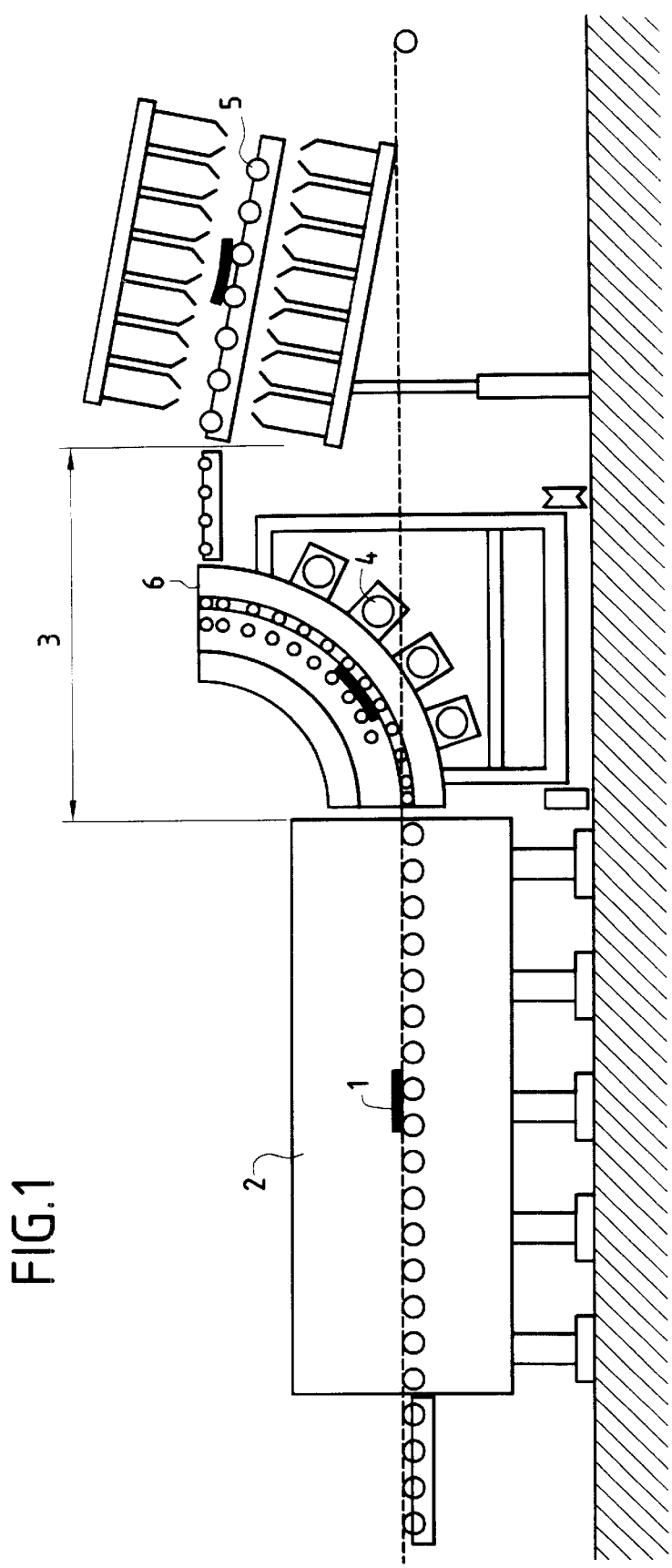
FIG. 1: a diagram of a production line adapted for use of a device according to the invention.
Figure 2:
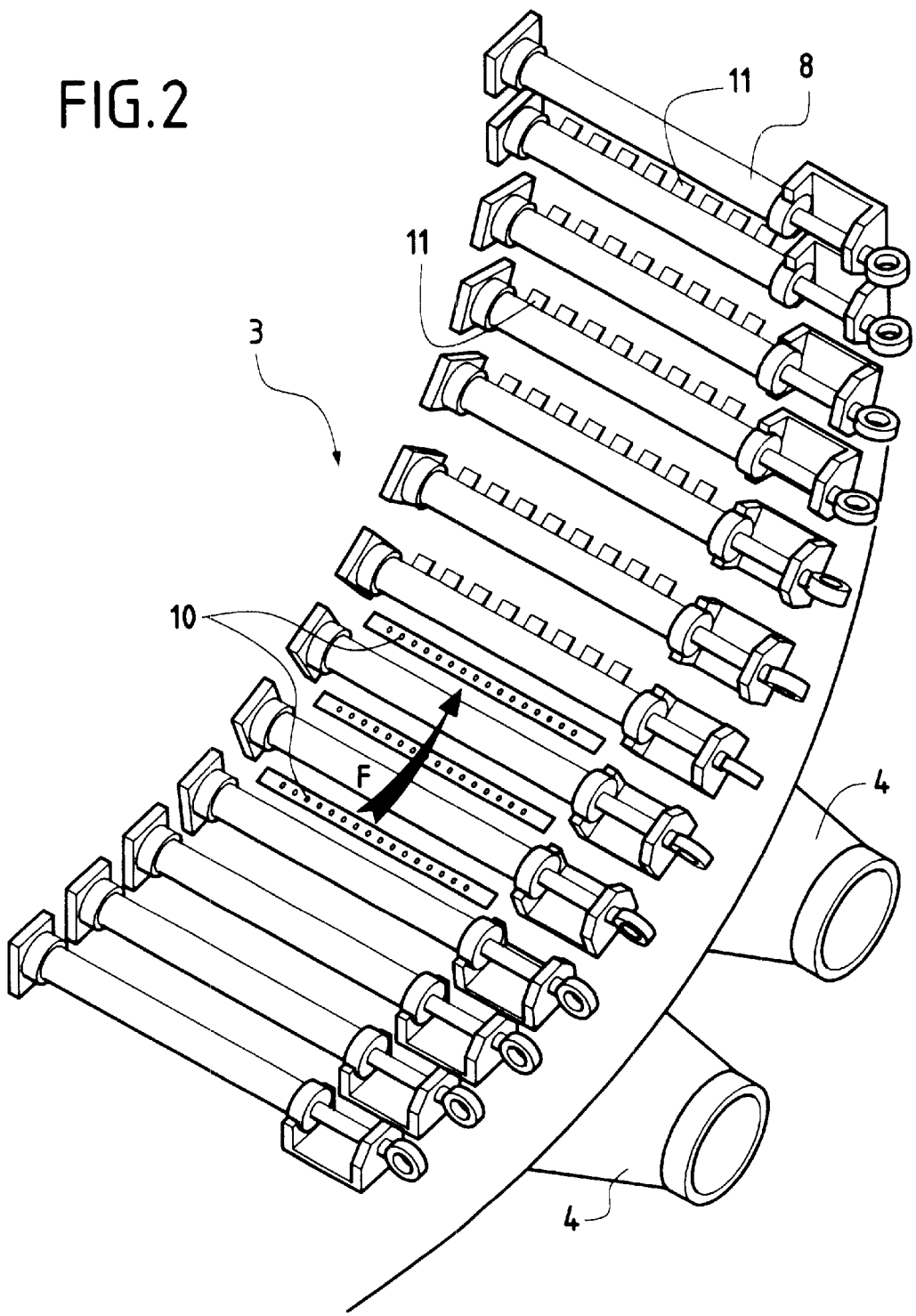
FIG. 2: a diagram of a partial view of part of the line in FIG. 1, into which a device according to the invention is inserted.
Figure 3:
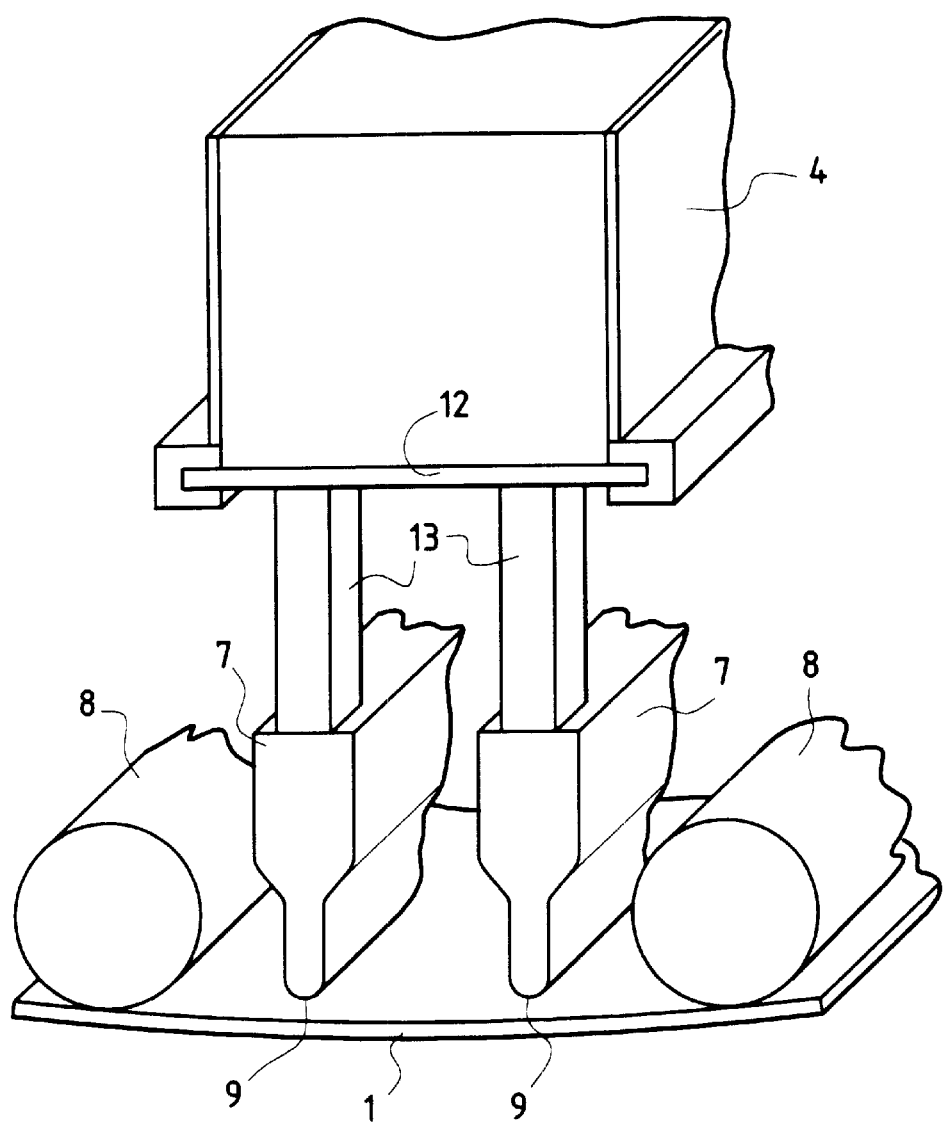
FIG. 3: a diagram of a partial view, in perspective, of one embodiment of a device according to the invention.

FIGS. 1, 2, 3 are merely diagrams that illustrate the invention and they do not include all the details of the plants and are not shown to scale in order to make it simpler to understand them.

Moreover, these FIGS. 1, 2, 3 should not be interpreted as being a limiting illustration of the invention.

In FIG. 1, only the conveying elements have been shown for the sake of greater clarity: FIG. 1 describes the path followed by the glass sheets in plants operating according to the technique, such as the plants known especially from Patent FR-B-2,242,219. According to this technique, the glass sheet 1 firstly passes through a heating zone 2 in which it is conveyed by a horizontal conveyor consisting of a series of driven rollers. Upon leaving the heating zone 2, its temperature then being greater than or equal to its bending temperature, it enters the first part of the bending zone 3 in which the rollers are mounted longitudinally with a cylindrical profile of radius R. The rollers thus form a shaping bed, preferably an upwardly concave one, and convey the sheets (from left to right in FIG. 1) on this bed; the glass sheets thus acquire a cylindrical curvature with a radius of curvature R obtained by the action either of gravity, or of possible upper elements, or of their speed, or else a combination of two or more of these factors.

The first part of the bending zone 3 is followed by a second part which is a cooling zone in which the rollers are likewise arranged in a circular profile of radius R. The cooling means consist of blowing boxes 4 arranged on each side of the rollers, thus acting on both faces of the window so that, by passing between these boxes 4 and depending on the blowing pressure, which is chosen as a function of its thickness, the bent glass sheet is either toughened or simply set in the bent position. The cooled glass sheets are finally removed by a flat conveyor 5 which passes through a secondary cooling zone, an optional tipping device 6 making it easier for them to leave the cooling zone 4.

Optionally, the glass sheet may be given a secondary curvature of radius r perpendicular to the main curvature of radius R and parallel to the straight edges, r preferably being greater than 5 metres, this limit depending on technical considerations relating to the construction of shaped rollers. In this case, the rollers will preferably be equipped with hogging devices, as indicated in Patent Application EP-A-413,619, and the shaping bed will additionally have a second set of rollers acting on the upper face of the glass sheet and helping to move the glass forwards. These upper elements are also used when the shaping bed follows a true, non-cylindrical, conic section.

The usual plants of this type combine blowing nozzles with the boxes 4. As mentioned previously, it appears that although the blowing pressure may be effectively increased, these plants come up against limits in the toughening of glass sheets, especially with regard to their thicknesses, because of the limited heat exchange coefficients.

According to the invention, the boxes 4, illustrated in FIGS. 2 and 3, are combined with other boxes 7 inserted between the rollers 8 of the conveyor in the second part of the bending zone 3.

FIG. 2 illustrates in more detail the lower part of the bending zone 3 which essentially consists of the rollers 8 along which the glass sheets run in the direction F.

According to this embodiment, the first three or four rollers 8 are sufficient for accomplishing the actual bending of the glass sheets. In the second part of the bending zone the glass sheets are cooled, for example to toughen them. What are thus inserted are the boxes 7 according to the invention which have a surface 9 drilled with holes 10 for driving the blowing air onto the glass sheets running along the rollers 8.

In the case shown in FIG. 2, the devices according to the invention, in an embodiment mentioned above, are only present at the start of the cooling zone. According to this embodiment, the end of the cooling zone is fitted with conventional nozzles 11. According to this embodiment, it is possible to improve the toughening of the glass sheets for a constant energy cost.

According to other embodiments, the device according to the invention is fitted to the entire cooling zone.

FIG. 3 describes in greater detail how the device according to the invention is inserted between two rollers 8.

In this FIG. 3, the supply box 4 is the one normally used, to which the blowing nozzles are connected. This is an obvious economic advantage of the invention, which in fact allows existing plants to be retained and the device according to the invention simply fitted to them. This fitting is accomplished by means of a mounting flange 12 which can be simply and quickly fixed; this makes it possible to change the cooling device and to go quickly from conventional blowing nozzles to a device according to the invention. The air is conducted from the boxes 4 to the boxes 7 via profiled tubes 13 which have a cross section sufficient to avoid pressure drops. The boxes 7 are closed at the other end by plates 9 with blowing holes 10 from which the air is driven onto the surface of the glass sheets 1 running along the rollers 8 of the conveyor. FIG. 3 shows that two boxes 7 are inserted between two rollers 8. This embodiment should not be interpreted in a limiting manner, an embodiment with only one or with more than two boxes 7 between two rollers 8 being realizable, depending on the space provided between the rollers 8.

Tests were carried out on a plant of the type shown in the figures. The device had the following characteristics: the plates 9 closing the boxes 7 had a width of 15 mm and two rows of 2.5 mm diameter holes 10, the distance separating two holes being 4 mm, so that "sticking" of two jets of blown air does not occur. The distance between two boxes 7 was at least 20 mm. The distance separating the plates 9 from the glass sheets was 7 mm, with a tolerance of 4 mm. The device presented and especially the number of rows of holes must not be interpreted in a limiting manner, it being possible for plates 9 having one row or more than two rows of holes 10 to be used.

The device thus described, combined with a blowing pressure of 3000 mm of water column, made it possible to toughen, according to the requirements of European Regulation No. 43 relating to safety glass windows, bent glass sheets with a thickness of 2.55 mm. The minimum thickness of the glass sheets toughened using the standard techniques is 3.15 mm.

The device according to the invention thus makes it possible to toughen thinner glass sheets by obtaining a higher heat transfer coefficient. If a glass sheet with a thickness of at least 3.15 mm is toughened using the device according to the invention, it is then also conceivable to increase the run speed of the glass sheets, to greater than 25 cm/s, the toughening being carried out more quickly. It is also possible, if the speed is not increased, to dispense with the system for tipping the glass sheets on leaving the toughening zone, since, these glass sheets being obtained more rapidly, the distance travelled by the latter allowing toughening to occur may be reduced. It is thus possible to collect the glass sheets without a system which is complicated to employ.

What is claimed is:

1. A device for cooling moving glass sheets, comprising:

a curved concave roller conveyor comprising a plurality of rollers arranged to support and bend a glass sheet being conveyed thereon; and at least one blowing box having a blowing means for cooling a glass sheet being bent and conveyed by said roller conveyor, said blowing means having a plurality of holes for discharging a cooling gas onto a glass sheet being bent and conveyed by said roller conveyor, said blowing means being arranged between, and relative to, said plurality of rollers such that said plurality of holes are less than 30 mm from a glass sheet being bent and conveyed by said roller conveyor.

2. The device according to claim 1, wherein said concave roller conveyor is upwardly curved in a direction of conveyance of the glass sheet.

3. The device according to claim 1, wherein said rollers each comprises an axisymmetric element.

4. The device according to claim 1, wherein said at least one box comprises a plurality of boxes having blowing parts arranged both above and below a path of a glass sheet being conveyed by said roller conveyor.

5. The device according to claim 1, wherein said holes have a diameter of between 2 and 8 mm, and a pitch of between 3 and 6 mm.

6. The device according to claim 1, wherein said at least one box is arranged on only one side of a path of a glass sheet being conveyed by said roller conveyor.

7. The device according to claim 1, wherein said plurality of holes are less than 10 mm from a glass sheet being conveyed by said roller conveyor.

8. A method for cooling glass sheets, comprising the steps of:

conveying and bending a glass sheet having a thickness of less than about 3 mm on a curved concave roller conveyor comprising a plurality of rollers arranged to support and bend the glass sheet being conveyed thereon; and cooling the glass sheet being bent and conveyed by said roller conveyor by blowing a cooling gas from a plurality of holes in a blowing part of at least one blowing box, said blowing part being arranged between and relative to said plurality of rollers such that said plurality of holes are less than 30 mm from the glass sheet being bent and conveyed by said roller conveyor.

9. The method according to claim 8, wherein said concave roller conveyor is upwardly curved in a direction of conveyance of the glass sheet.

10. The method according to claim 8, wherein the cooling gas is blown with a pressure of less than 3000 mm WC.

11. The method according to claim 8, wherein the cooling step is performed such as to provide a coefficient of heat exchange of at least 800 W/m²·K.

12. The method according to claim 8, wherein the cooling step is performed such as to provide a coefficient of heat exchange of at least 1000 W/m²·K.

13. The method according to claim 8, wherein the glass sheet has a thickness of less than about 2.8 mm.

14. A device for cooling moving glass sheets, comprising:

a curved roller conveyor comprising a plurality of rollers arranged to support and bend a glass sheet being conveyed thereon; and at least one blowing box having a blowing means for cooling a glass sheet being bent and conveyed by said roller conveyor, said blowing means having a plurality of holes for discharging a cooling gas onto a glass sheet being bent and conveyed by said roller conveyor, said blowing means being arranged between, and relative to, said plurality of rollers such that said plurality of holes are less than 30 mm from a glass sheet being bent and conveyed by said roller conveyor.

15. The device according to claim 14, wherein said roller conveyor is upwardly curved in a direction of conveyance of the glass sheet.

16. The device according to claim 14, wherein said rollers each comprises an axisymmetric element.

17. The device according to claim 14, wherein said at least one box comprises a plurality of boxes having blowing parts arranged both above and below a path of a glass sheet being conveyed by said roller conveyor.

18. The device according to claim 14, wherein said holes have a diameter of between 2 and 8 mm, and a pitch of between 3 and 6 mm.

19. The device according to claim 14, wherein said at least one box is arranged on only one side of a path of a glass sheet being conveyed by said roller conveyor.

20. The device according to claim 14, wherein said plurality of holes are less than 10 mm from a glass sheet being conveyed by said roller conveyor.

21. A method for cooling glass sheets, comprising the steps of conveying and bending a glass sheet having a thickness of less than about 3 mm on a curved roller conveyor comprising a plurality of rollers arranged to support and bend the glass sheet being conveyed thereon; and cooling the glass sheet being bent and conveyed by said roller conveyor by blowing a cooling gas from a plurality of holes in a blowing part of at least one blowing box, said blowing part being arranged between and relative to said plurality of rollers such that said plurality of holes are less than 30 mm from the glass sheet being bent and conveyed by said roller conveyor.

22. The method according to claim 21, wherein said roller conveyor is upwardly curved in a direction of conveyance of the glass sheet.

23. The method according to claim 21, wherein the cooling gas is blown with a pressure of less than 3000 mm WC.

24. The method according to claim 21, wherein the cooling step is performed such as to provide a coefficient of heat exchange of at least 800 W/m²·K.

25. The method according to claim 21, wherein the cooling step is performed such as to provide a coefficient of heat exchange of at least 1000 W/m²·K.

26. The method according to claim 21, wherein the glass sheet has a thickness of less than about 2.8 mm.

* * * * *

UNITED STATES PATENT AND TRADEMARK OFFICE
CERTIFICATE OF CORRECTION

PATENT NO. : 6,598,427 B1
DATED : July 29, 2003
INVENTOR(S) : Douche et al.

It is certified that error appears in the above-identified patent and that said Letters Patent is hereby corrected as shown below:

<u>Title page,</u>
Item [86], Filing Date should read:
-- [86]  PCT No.:     PCT/FR98/01933

§ 371 (c)(1),
(2), (4) Date:    Oct. 8, 1999 --

Signed and Sealed this

Twenty-seventh Day of April, 2004

JON W. DUDAS
*Acting Director of the United States Patent and Trademark Office*